(No Model.)

B. MORRIS.
COMBINED COTTON PLANTER AND CULTIVATOR.

No. 271,101. Patented Jan. 23, 1883.

WITNESSES:
Francis McArdle
C. Sedgwick

INVENTOR:
B. Morris
BY Munn & Co
ATTORNEYS.

UNITED STATES PATENT OFFICE.

BURREL MORRIS, OF NEWTON FACTORY, GEORGIA.

COMBINED COTTON PLANTER AND CULTIVATOR.

SPECIFICATION forming part of Letters Patent No. 271,101, dated January 23, 1883.

Application filed July 18, 1882. (No model.)

*To all whom it may concern:*

Be it known that I, BURREL MORRIS, of Newton Factory, in the county of Newton and State of Georgia, have invented a new and Improved Combined Cotton Planter and Cultivator, of which the following is a full, clear, and exact description.

The invention consists in the improved means for cultivating crops hereinafter described.

Reference is to be had to the accompanying drawings, forming part of this specification, in which similar letters of reference indicate corresponding parts in all the figures.

Figure 1:
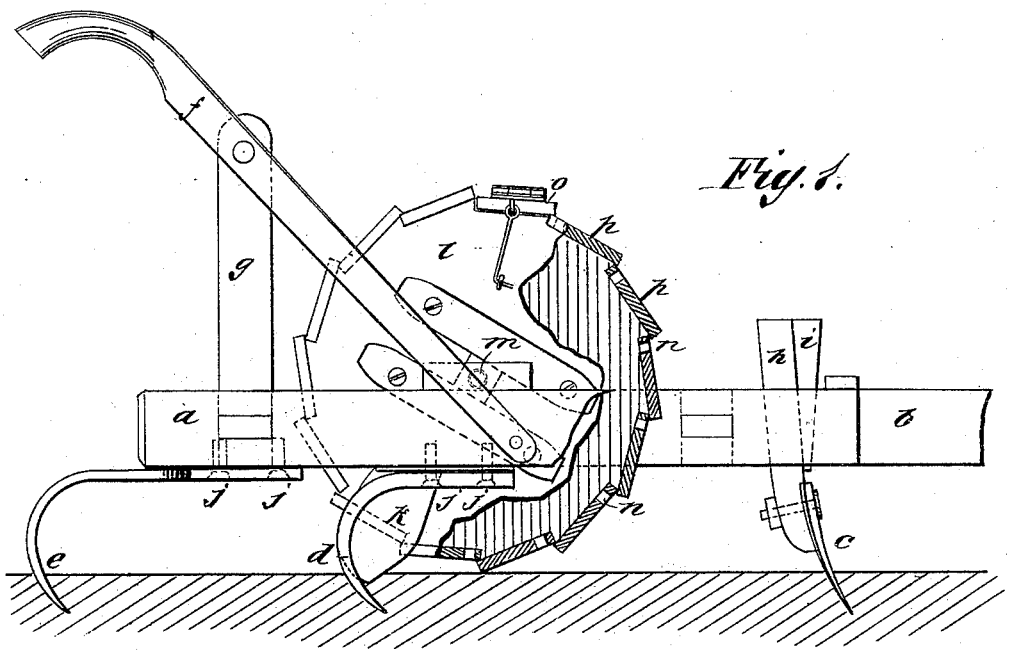
Figure 2:
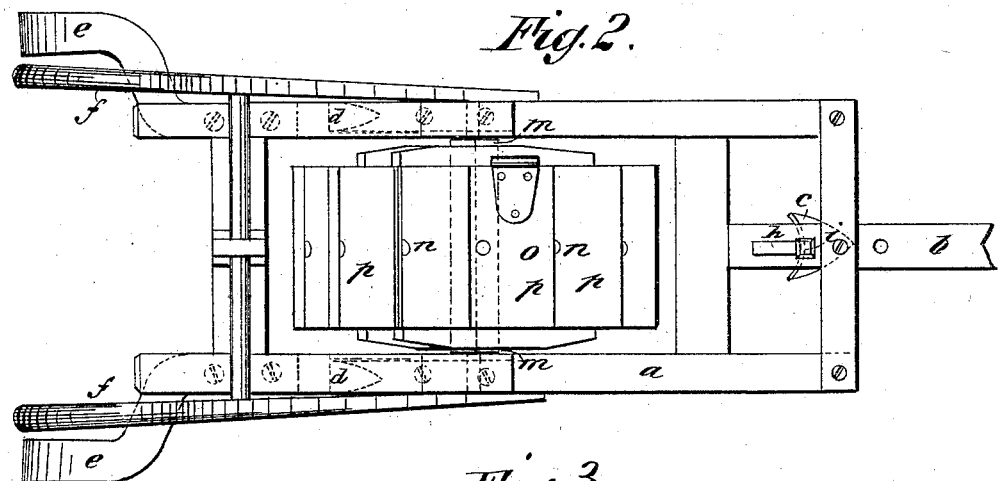
Figure 3:
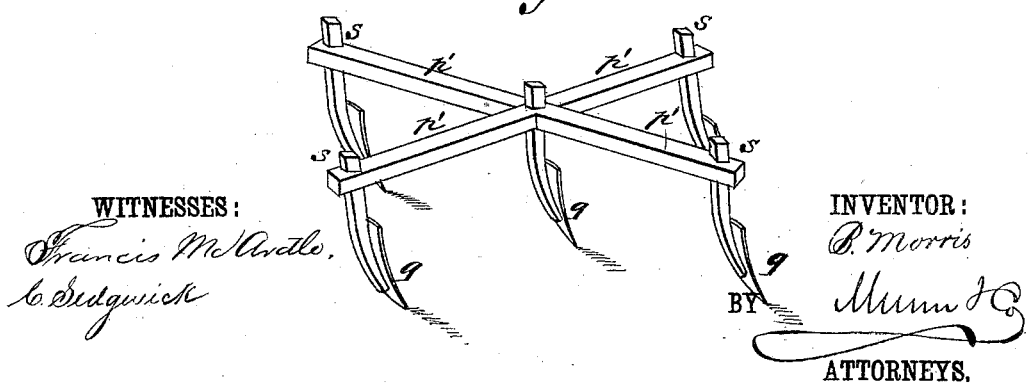

Figure 1 represents my improved combined planter and cultivator, partly in side elevation and partly in longitudinal section. Fig. 2 is a plan view, and Fig. 3 is a perspective view, of a cultivating attachment of modified form.

I make a suitable rectangular frame, $a$, with a tongue, $b$, for hitching on the team, and attach a front middle cultivator-plow, $c$, two intermediate side plows, $d$, and two rear side plows, $e$, the said frame being also provided with handles $f$, of the usual form, attached to the frame $a$ and supported by standards $g$. The front plow, $c$, is detachably connected to the frame by its stock $h$ and a key, $i$, fitted in a slot of the tongue, and the side plows, $d$ and $e$, are detachable by means of removable bolts or screws $j$. The middle side plows, $d$, have knife-plate-shaped guards $k$, which are to protect the young plants from having too much earth thrown on them by the plows $d$ in the first dressing.

Between the side bars of the frame $a$, at the middle, between the ends or thereabout, I have arranged a cotton-seed drum, $l$, on pivots $m$, for rolling along the ground to discharge the seed successively through the orifices $n$ in the periphery of the drum, the said drum being charged with a quantity of seed through the door $o$ to begin with; and in order to shake and stir the seed within the drum to prevent it from clogging together and obstructing the passages, I have arranged the sections $p$ in the overlapping arrangement shown in Fig. 1 to form ledges, against which the masses of seed will fall and be separated.

When I use the machine for planting, I detach the two hind plows, $e$, using the front plow, $c$, to open the furrows, the drum to deposit the seed, and the middle side plows, $d$, to cover the seeds, the said plows $d$ being then divested of the guards $k$.

When I use the machine as an ordinary cultivator, I employ all the plows, but detach the drum. For cultivating cotton, I detach the front plow, $c$, and use the rest without the drum, the plows $d$ being then provided with the guards $k$. For certain kinds of cultivation I apply an attachment consisting of the cross-arms $p'$, having plows $q$ in the ends and at the center of the cross-bars, as shown in Fig. 3, the said attachment being applied in the place of the planting-drum and secured in any approved way under the frame or by the ends $s$ of the plow-stocks being fitted in sockets in the under side of the frame. When this attachment is used the other plows may remain or be taken off, as preferred; but the drum will be removed.

Having thus fully described my invention, I claim as new and desire to secure by Letters Patent—

The rotary cotton-seed dropper $l$, having sections $p$ overlapping each other at their edges, and having the seed-discharge holes $n$ near the edge of and in the inward laps, whereby the seed is prevented from clogging the holes by the ledges formed near them and the seed is evenly distributed.

BURREL MORRIS.

Witnesses:
W. E. TUCKER,
JNO. V. WOODSON.